US00RE50228E

(19) United States
(12) Reissued Patent
Bauer et al.

(10) Patent Number: US RE50,228 E
(45) Date of Reissued Patent: Dec. 10, 2024

(54) WALLET

(71) Applicant: Thread Wallets LLC, Provo, UT (US)

(72) Inventors: Colby S. Bauer, Provo, UT (US); McKenzie K. Bauer, Provo, UT (US)

(73) Assignee: THREAD WALLETS LLC, Provo, UT (US)

(21) Appl. No.: 29/898,942

(22) Filed: Aug. 2, 2023

Related U.S. Patent Documents

Reissue of:
(64) Patent No.: Des. 903,312
Issued: Dec. 1, 2020
Appl. No.: 29/701,500
Filed: Aug. 12, 2019

U.S. Applications:
(63) Continuation of application No. 29/849,109, filed on Aug. 8, 2022, which is an application for the reissue of Pat. No. Des. 903,312.

(51) LOC (14) Cl. ..... 03-01
(52) U.S. Cl.
USPC ..... D3/247; D3/300
(58) Field of Classification Search
USPC .... D13/107–108, 103, 119; D14/217, 238.1, D14/240, 248, 250, 251–253, 439, 440, D14/447; D3/201, 269, 273, 301, 218, D3/247, 249, 303
CPC .. H04B 1/3888; H04B 1/0283; H04B 1/0202; A45C 1/06; A45C 11/00; A45C 13/02; A45C 2011/002; A45F 2005/026; A45F 2200/0525; A45F 2200/0516
See application file for complete search history.

(56) References Cited

U.S. PATENT DOCUMENTS 175,822 A 4/1876 Conlan
501,431 A 7/1893 Lambert
1,110,760 A 9/1914 Easton
1,423,669 A 7/1922 Charles
1,619,644 A 3/1927 Wetzel
1,693,006 A 11/1928 Edward
1,699,865 A * 1/1929 Walton ..... A45C 11/323 206/38.1
1,782,003 A 11/1930 Epstein
1,842,870 A 1/1932 Harwood, Jr.
1,856,703 A 5/1932 Groom
2,095,593 A 10/1937 Buxton
2,154,826 A 4/1939 Bernard et al.
2,288,704 A 7/1942 Herbener
2,556,310 A 6/1951 Whitmer
2,609,025 A 9/1952 Tolbert
2,788,041 A 4/1957 Carver
2,796,904 A 6/1957 Bigelow
3,162,227 A 12/1964 Joseph
3,444,914 A 5/1969 French et al.
3,446,260 A 5/1969 Osher
3,470,931 A 10/1969 Ervin
3,856,063 A 12/1974 Dengel
D272,016 S 1/1984 Blair
4,671,332 A 6/1987 McPhee
D307,979 S 5/1990 Purvis
D336,565 S 6/1993 Wenk
D338,103 S 8/1993 Eschmann
D340,355 S 10/1993 Little
5,308,308 A 5/1994 Bauman
D370,119 S 5/1996 McDaniel
D380,009 S 6/1997 Pycher
D385,417 S 10/1997 White et al.
D411,765 S 7/1999 Holihan
5,944,080 A 8/1999 Podwika
D433,804 S 11/2000 Kojoori
D436,252 S 1/2001 Gribovsky
D436,724 S 1/2001 Kojoori
D438,373 S 3/2001 Riley
6,435,236 B2 8/2002 Gribovsky
D471,008 S 3/2003 Dubone
D474,017 S 5/2003 Burns
6,619,349 B2 9/2003 Gribovsky
D499,547 S * 12/2004 Brown ..... D3/273
D502,596 S 3/2005 Smoot
D527,891 S 9/2006 Hoeksema
D575,569 S * 8/2008 Martinetti ..... D3/300
D593,749 S 6/2009 Holzner et al.
7,546,860 B1 6/2009 Mehdizadeh
D596,392 S 7/2009 Cohen
D600,011 S 9/2009 Munroe
7,604,028 B2 10/2009 Bridgefarmer
D609,457 S 2/2010 Blanford et al.
D627,965 S 11/2010 Berck
D677,053 S * 3/2013 Lyons ..... D3/300
D694,007 S 11/2013 D'Amore et al.

NEW

| | | | | | |
|---|---|---|---|---|---|
| D716,049 | S | * | 10/2014 | Fair | D3/303 |
| D736,520 | S | * | 8/2015 | Gross | D3/300 |
| D782,189 | S | | 3/2017 | Bauer et al. | |
| D782,190 | S | | 3/2017 | Bauer et al. | |
| D833,143 | S | | 11/2018 | Dechant | |
| D846,280 | S | * | 4/2019 | Bo | D3/303 |
| 10,420,403 | B1 | * | 9/2019 | Calder | A45C 1/06 |
| D863,761 | S | * | 10/2019 | Bermond | D3/247 |
| D866,963 | S | | 11/2019 | Burko | |
| 10,506,857 | B2 | * | 12/2019 | Altschul | A45C 13/002 |
| D898,353 | S | * | 10/2020 | Hagan | D3/247 |
| D903,312 | S | * | 12/2020 | Bauer | D3/300 |
| D967,625 | S | * | 10/2022 | Akana | D3/247 |
| 2003/0178461 | A1 | | 9/2003 | Shattuck | |
| 2005/0035006 | A1 | | 2/2005 | Dohner | |
| 2005/0205435 | A1 | | 9/2005 | Loy | |
| 2008/0023114 | A1 | | 1/2008 | Bridgefarmer | |
| 2011/0030860 | A1 | | 2/2011 | Allen et al. | |
| 2013/0037187 | A1 | * | 2/2013 | D'Amore | A45C 15/00 150/147 |
| 2013/0276943 | A1 | | 10/2013 | Minn et al. | |
| 2015/0335113 | A1 | | 11/2015 | Minn et al. | |
| 2016/0073747 | A1 | | 3/2016 | Whichel | |
| 2017/0035169 | A1 | | 2/2017 | Haarburger | |
| 2017/0119119 | A1 | | 5/2017 | Borosevich | |
| 2017/0135452 | A1 | | 5/2017 | Kane | |
| 2018/0006676 | A1 | * | 1/2018 | Zavala | A45C 1/08 |
| 2018/0110305 | A1 | | 4/2018 | Kim et al. | |
| 2018/0116352 | A1 | | 5/2018 | Despain | |
| 2018/0235338 | A1 | | 8/2018 | Lamb et al. | |
| 2018/0332936 | A1 | | 11/2018 | Serman | |
| 2019/0246758 | A1 | | 8/2019 | Herrington | |
| 2019/0313755 | A1 | | 10/2019 | Van Geer | |
| 2020/0163424 | A1 | | 5/2020 | Mayer | |
| 2020/0229557 | A1 | | 7/2020 | Tran et al. | |
| 2020/0290766 | A1 | | 9/2020 | Whitehurst | |
| 2020/0315308 | A1 | | 10/2020 | Van Geer | |
| 2021/0219685 | A1 | | 7/2021 | Van Geer | |
| 2022/0031032 | A1 | | 2/2022 | Bauer et al. | |
| 2022/0312919 | A1 | | 10/2022 | Elmar | |
| 2023/0089796 | A1 | | 3/2023 | Shields | |

FOREIGN PATENT DOCUMENTS

| | | | |
|---|---|---|---|
| CA | 2994836 | A1 | 2/2017 |
| CA | 2946972 | A1 | 5/2017 |
| CA | 3023429 | A1 | 11/2017 |
| CA | 3023430 | A1 | 11/2017 |
| CA | 3023431 | A1 | 1/2018 |
| CA | 2964570 | A1 | 10/2018 |
| CA | 3071482 | A1 | 2/2019 |
| CA | 3033806 | A1 | 8/2019 |
| CA | 3060799 | A1 | 1/2020 |
| CA | 3143831 | A1 | 1/2021 |
| CA | 3178512 | A1 | 12/2021 |
| CA | 3125396 | A1 | 2/2022 |
| CA | 3192336 | A1 | 3/2022 |
| CA | 3193828 | A1 | 4/2022 |
| FR | 3026925 | A1 | 4/2016 |
| GB | 6071172 | | 9/2019 |
| KR | 20-0447574 | Y1 | 2/2010 |
| KR | 20-0453314 | Y1 | 4/2011 |
| WO | 2012/169749 | A2 | 12/2012 |
| WO | 2013/040771 | A1 | 3/2013 |

OTHER PUBLICATIONS

"A Few of the Best Elastic Wallets." Tools and Toys., Jul. 26, 2017 [online], [retrieved on Apr. 19, 2024]. Retrieved from the Internet <URL: http://toolsandtoys.net/guides/a-few-of-the-best-elastic-wallets/>.*

"Contrast Elastic Card Wallet." Orvis., Feb. 14, 2024 [online], [retrieved on Apr. 19, 2024]. Retrieved from the Internet <URL: https://www.orvis.com/product/contrast-elastic-card-wallet/3HPF.html>.*

"Thread Wallets Ultra Slim Card Holder Wallet—Slim Wallet for Women & Men—Minimalist Wallets for Women—Small Wallet for Women & Men—Modern Credit Card Organizer Mini Wallet (Fine Line)." Amazon., Jan. 27, 2024 [online], [retrieved on Apr. 19, 2024]. Retrieved from the Internet <URL: https://www.amazon.com/Thread-Wallets-Minimalist-Wallet-Pocket/dp/B07886LC4F?th=1>.*

"The Leo", Retrieved from https://andar.com/collections/card-holders/products/the-leo, Retrieved on Aug. 2022, 6 Pages.

Amazon.com, Site visited Feb. 28, 2024, FOXHACKLE Leather Credit Card Holder Wallet, Date first available, Jul. 8, 2019, https://www.amazon.com/FOXHACKLE-Pocket-Leather-Minimalist-Handmade/dp/B08DNPQC99 (Year: 2019).

Crabby Wallet; www.crabbygear.com; accessed Jul. 17, 2015; 1 pg.

Elephant Wallet; www.elephantwallet.com; accessed Jul. 17, 2015; 2 pg.

Final Office Action received for U.S. Appl. No. 16/983,884, mailed on Dec. 19, 2022, 31 pages.

Leatherboss: https://www.amazon.com/Leather-Credit-Wallet-Drivers-License/dp/B011D8SOLO/ (Year: 2016).

Modern Carry: https://www.amazon.com/Slim-Credit-Wallet-Modern-Carry/dp/B07ZDNC4SP/ (Year: 2016).

Non-Final Office Action received for U.S. Appl. No. 16/983,884, mailed on Mar. 29, 2022, 20 pages.

Non-Final Office Action received for U.S. Appl. No. 16/983,884, mailed on Mar. 28, 2023, 29 pages.

Non-Final Rejection Mailed on Mar. 11, 2024 for U.S. Appl. No. 29/865,260, 11 page(s).

Notice of Allowance received for U.S. Appl. No. 29/849,109, mailed on Apr. 20, 2023, 2 pages.

Notice of Allowance received for U.S. Appl. No. 29/849,109, mailed on Mar. 23, 2023, 11 pages.

Notice of Allowance received for U.S. Appl. No. 29/849,109, mailed on Mar. 29, 2024, 2 pages.

Notice of Allowance received for U.S. Appl. No. 29/849,109, mailed on May 15, 2024, 3 pages.

Notice of Allowance received for U.S. Appl. No. 29/849,109, mailed on May 19, 2023, 2 pages.

Office Action received for Canadian Patent Application No. 3125396, mailed on Nov. 14, 2023, 04 pages.

Slim Wallet; www.suprgood.com; accessed Jul. 17, 2015; 2 pg.

Thread Wallets 2.0 Slim Wallet For The Stylish Minimalist posted at Kickstarter.com, posting date Mar. 13, 2015, (Copyrights) 2016 Kickstarter.com, [online], [site visited Jul. 27, 2016]. Available from Internet, <URL: https://www.kickstarter.com/projects/798397208/thread-wallets-wallets-that-match-your-lifestyle/description>.

Tight Wallet; www.tightstore.com; accessed Jul. 17, 2015; 3 pg.

VBAX: https://www.amazon.com/dp/B07FZ4GY5W/ (Year: 2018).

Youtube.com, Site visited Feb. 28, 2024, "NOMAD's slim bifold can stop wandering," published by walletopia on May 17, 2019, https://www.youtube.com/watch?v=CZ_KphjyIVU (Year: 2019).

* cited by examiner

*Primary Examiner* — Darlington Ly
(74) *Attorney, Agent, or Firm* — Workman Nydegger

(57) CLAIM

The ornamental design for a wallet, as shown and described.

DESCRIPTION

[FIG. 1 is a top, facing, left perspective view of our new design for a wallet;]
[FIG. 2 is a top plan view thereof;]
[FIG. 3 is a bottom plan view thereof;]
[FIG. 4 is an elevated facing view thereof;]
[FIG. 5 is an elevated rear view thereof;]
[FIG. 6 is an elevated left side view thereof; and,]
[FIG. 7 is an elevated right side view thereof.]
*FIG. 8 is a top, facing, left perspective view of our new design for a wallet;*

*FIG. 9 is a top plan view thereof;*
*FIG. 10 is a bottom plan view thereof;*
*FIG. 11 is an elevated facing view thereof;*
*FIG. 12 is an elevated rear view thereof;*
*FIG. 13 is an elevated left side view thereof; and,*
*FIG. 14 is an elevated right side view thereof.*

Dotted lines of equal length shown in the Figures represent stitching that forms part of the claimed design. Dotted lines of alternating long and short dashes represent [unclaimed subject matter] *portions of the wallet* that forms no part of the claimed design. [Separation lines in the drawings show indeterminate length, and the space between separation lines is unclaimed.] *The wallet is shown with a symbolic break in its length. The appearance of any portions of the wallet between the break lines forms no part of the claimed design.*

1 Claim, 6 Drawing Sheets

---

Figure 1:
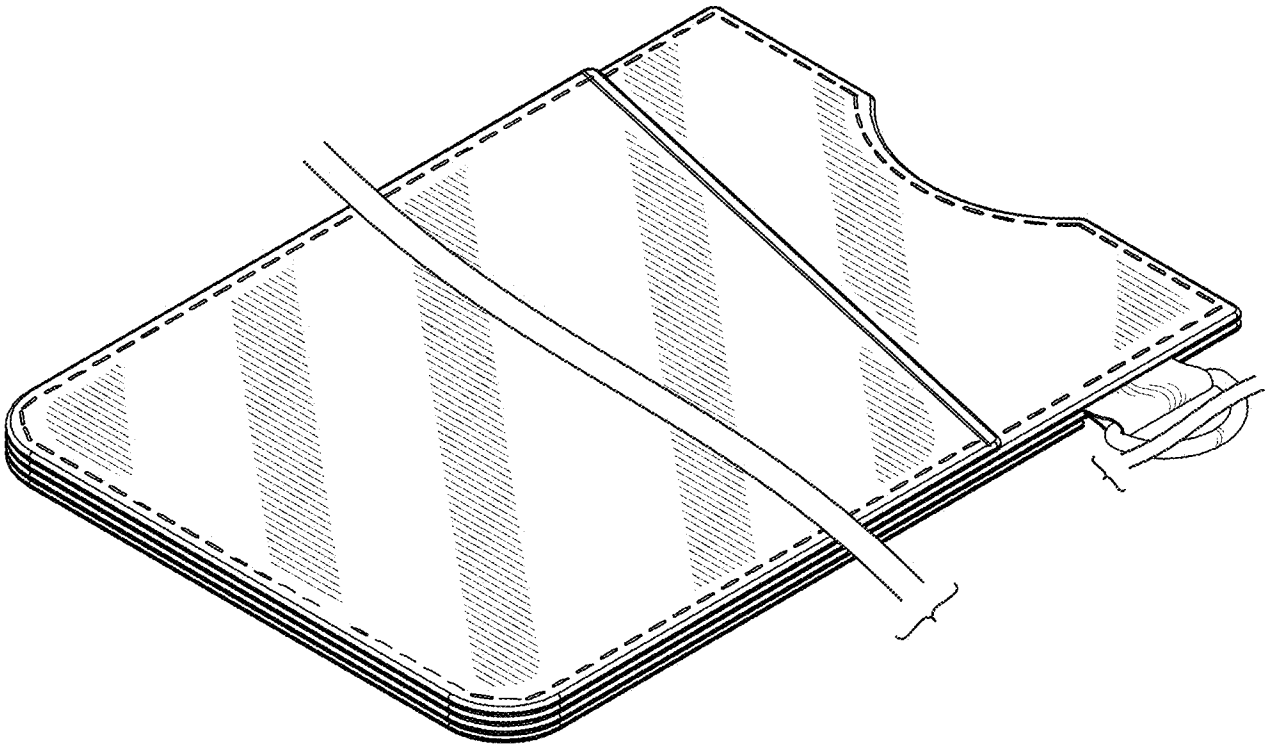
Figure 2:
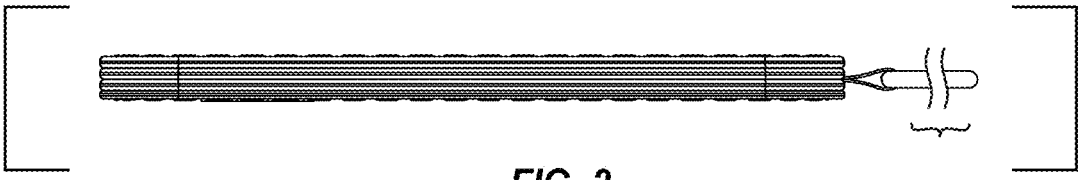
Figure 3:
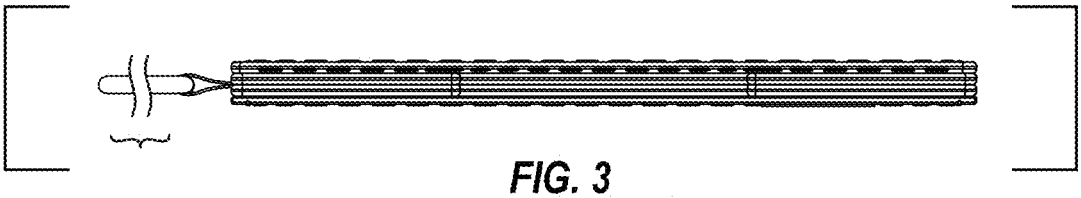
Figure 4:
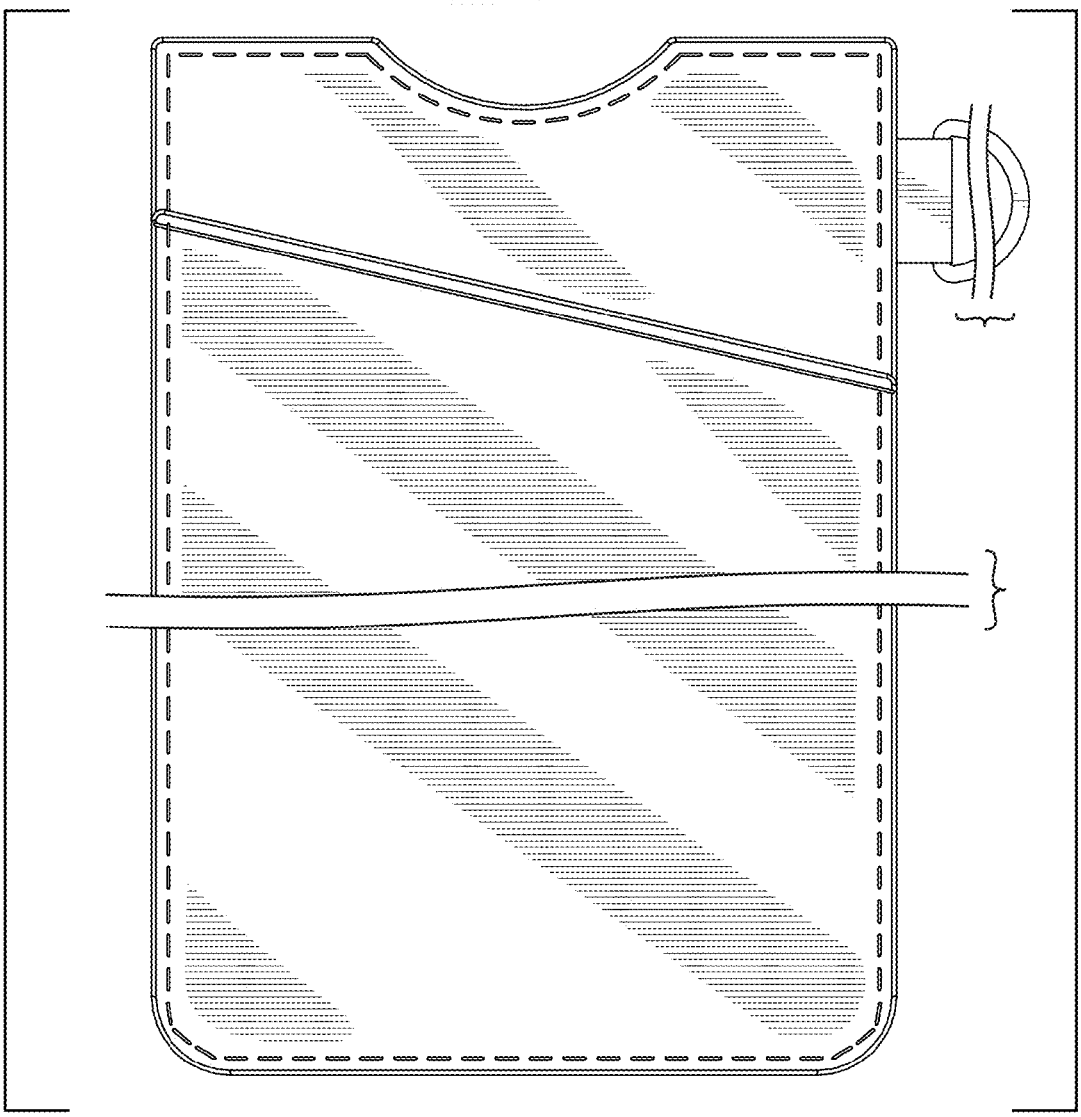
Figure 5:
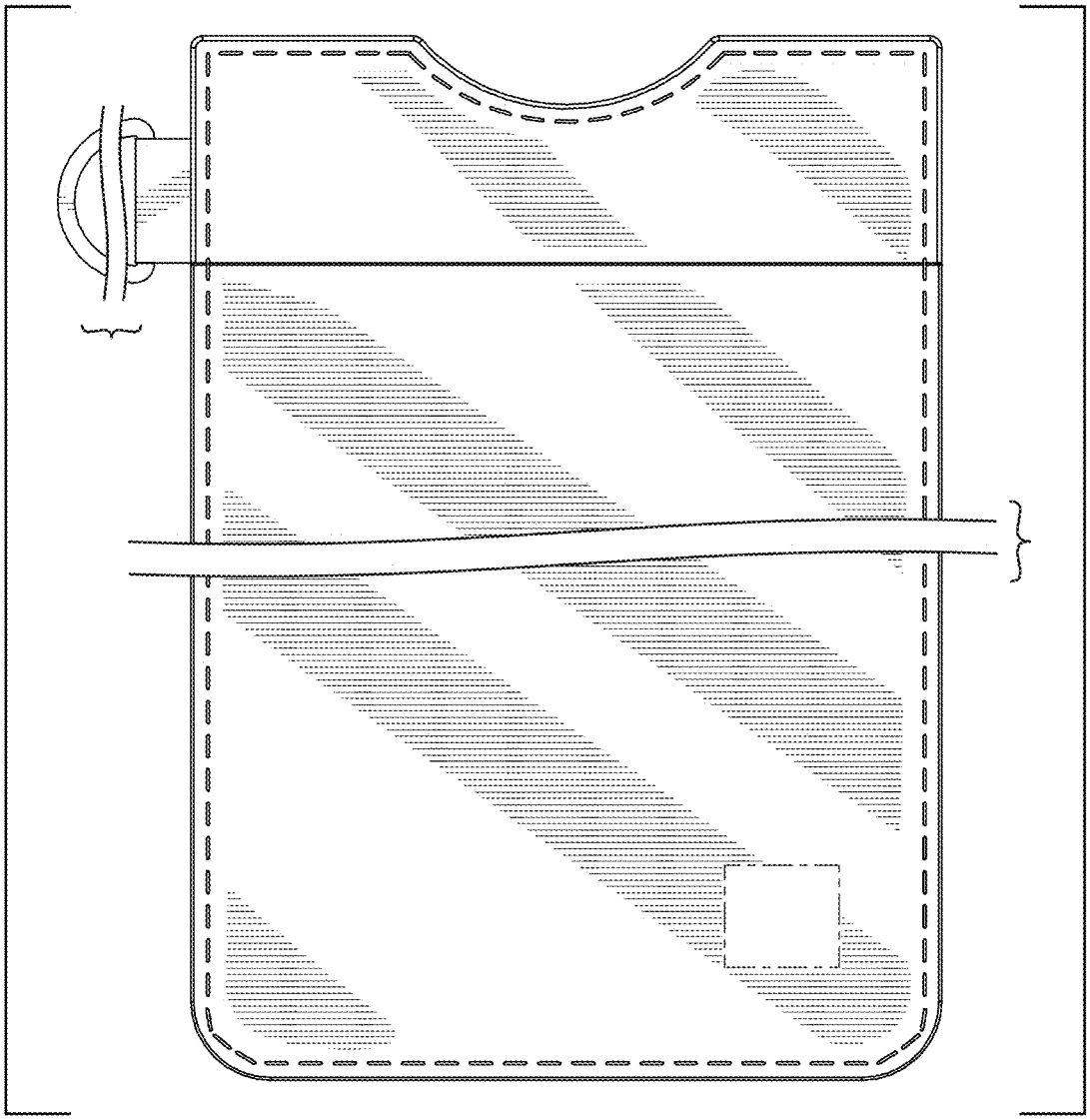
Figure 6:
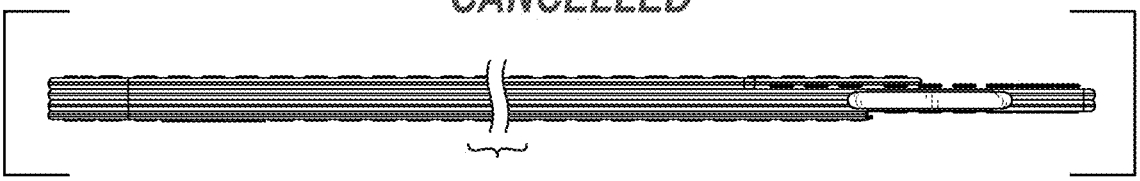
Figure 7:
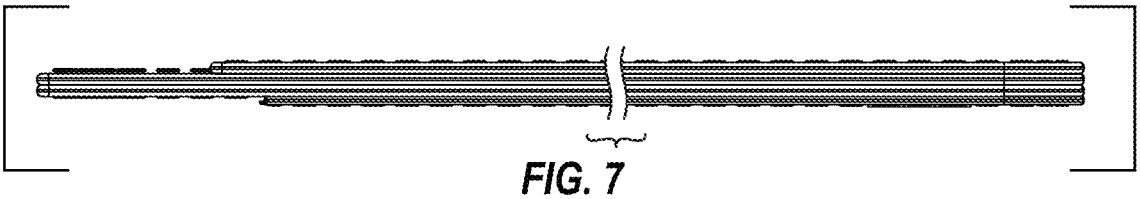

Matter enclosed in heavy brackets [ ] appears in the original patent but forms no part of this reissue; matter printed in italics indicates the additions made by reissue.

CANCELLED

CANCELLED

CANCELLED

CANCELLED

CANCELLED

CANCELLED

CANCELLED

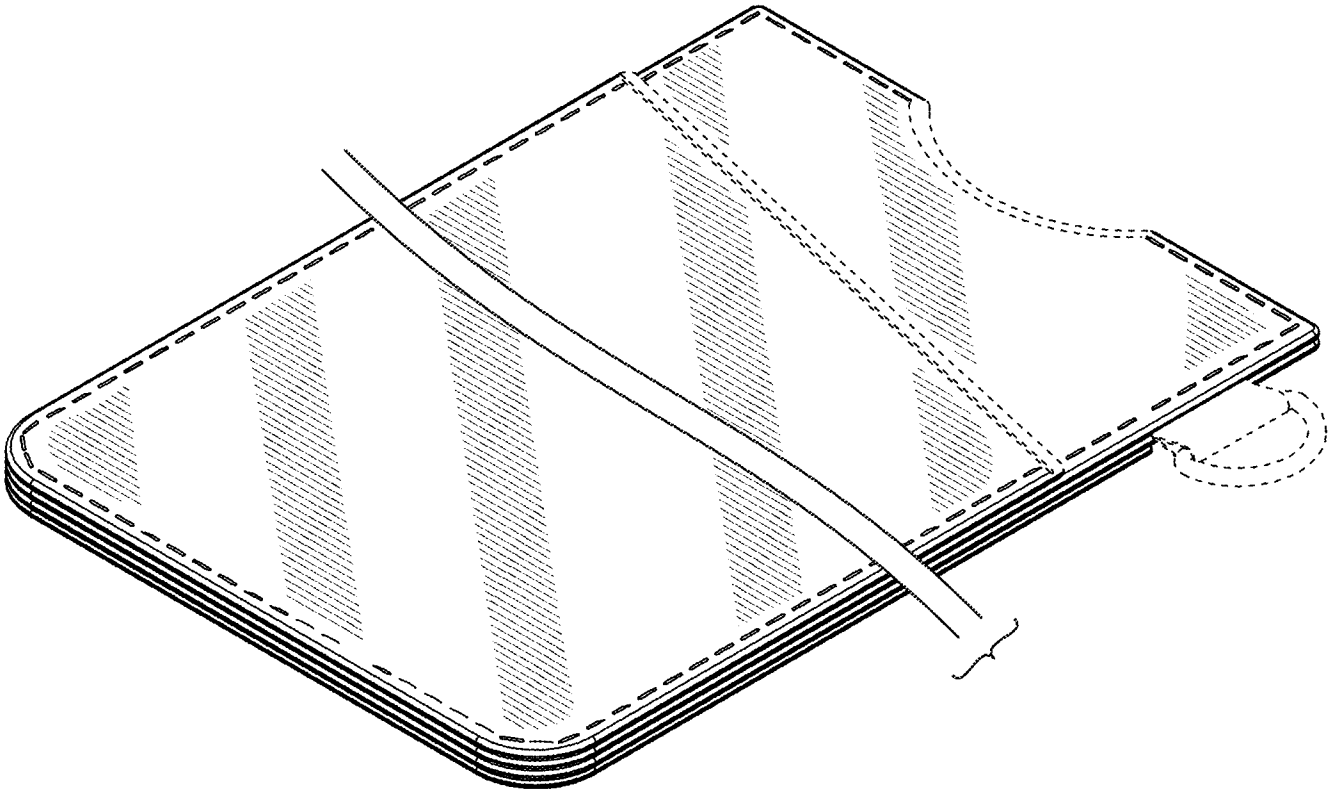
FIG. 8
NEW

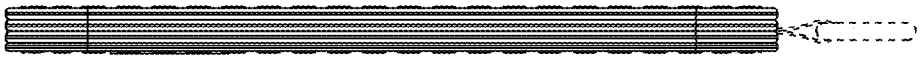
FIG. 9
NEW
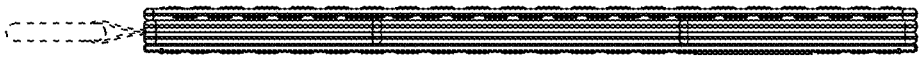
FIG. 10
NEW
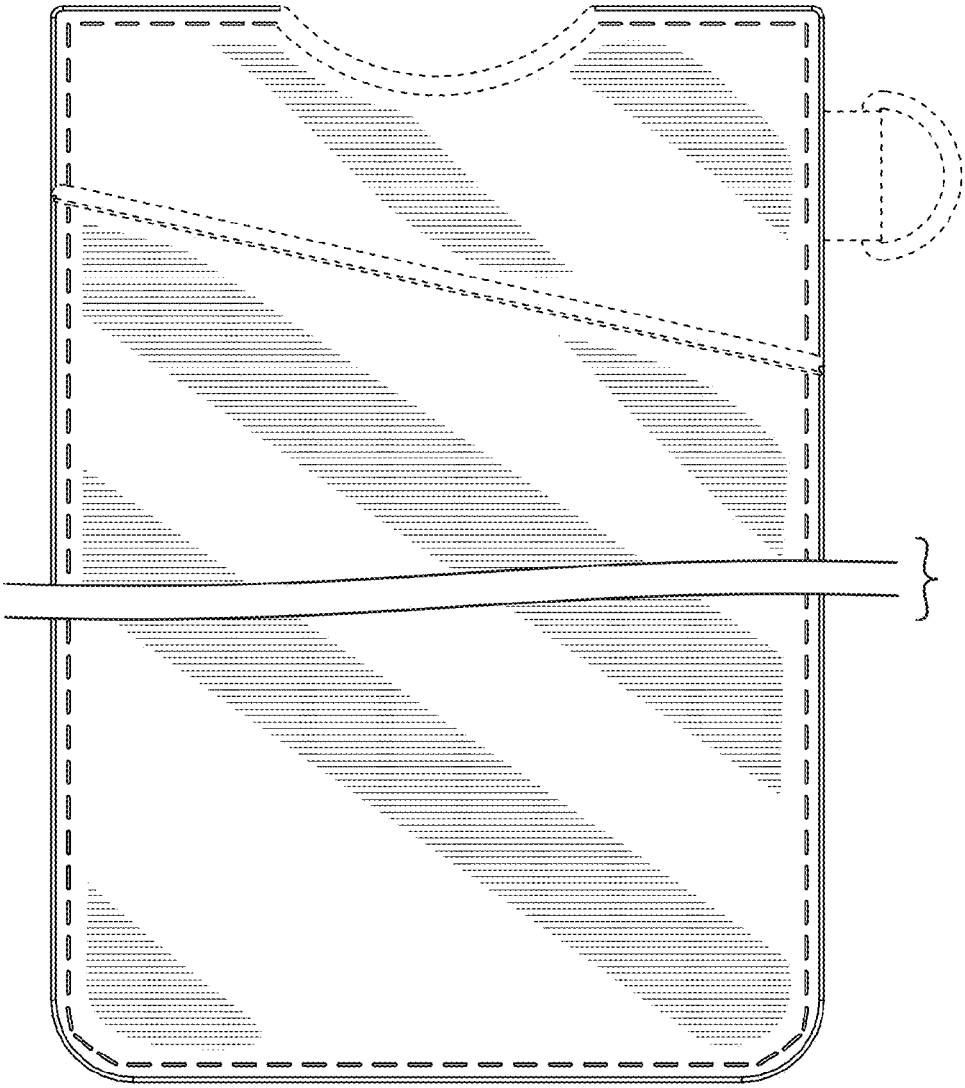
FIG. 11
NEW

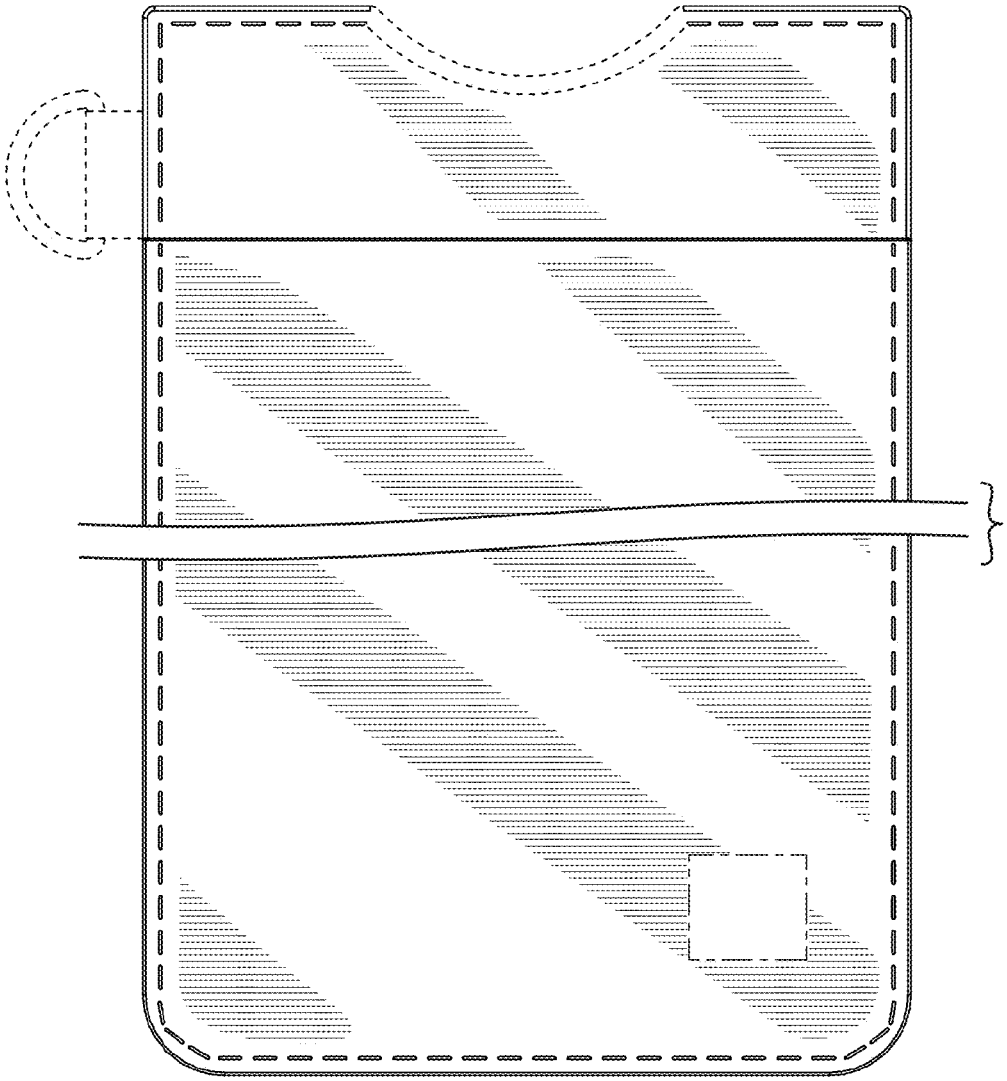
FIG. 12
NEW
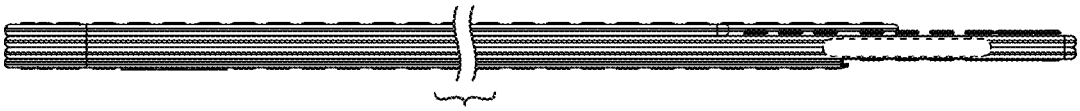
FIG. 13
NEW
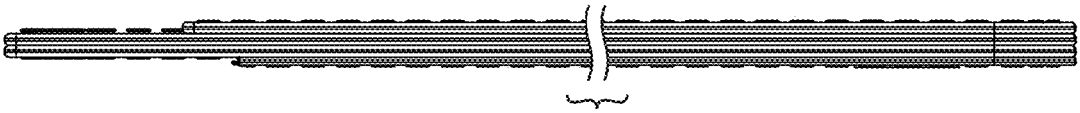
FIG. 14
NEW